Sept. 1, 1936.　　　　G. MAKAROFF　　　　2,052,837
GRINDING DEVICE
Filed Aug. 16, 1934　　　　3 Sheets-Sheet 1

Inventor
Gregory Makaroff
By Clarence A. O'Brien
Attorney

Sept. 1, 1936.                G. MAKAROFF                2,052,837
                             GRINDING DEVICE
                          Filed Aug. 16, 1934           3 Sheets-Sheet 2
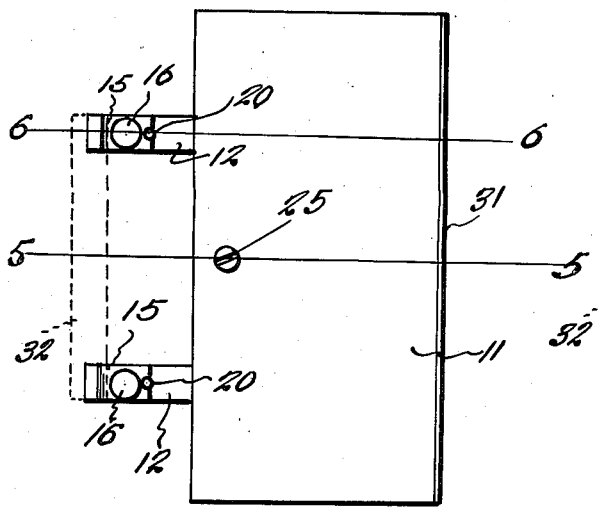
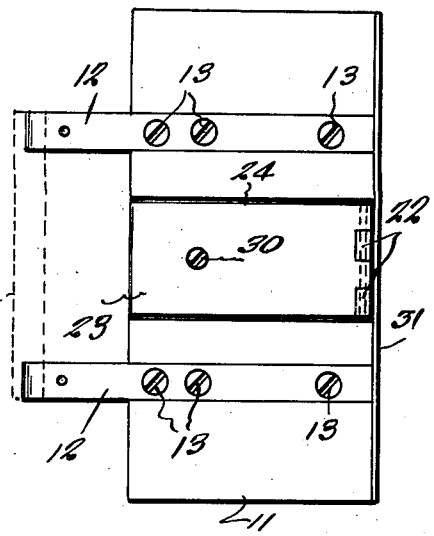
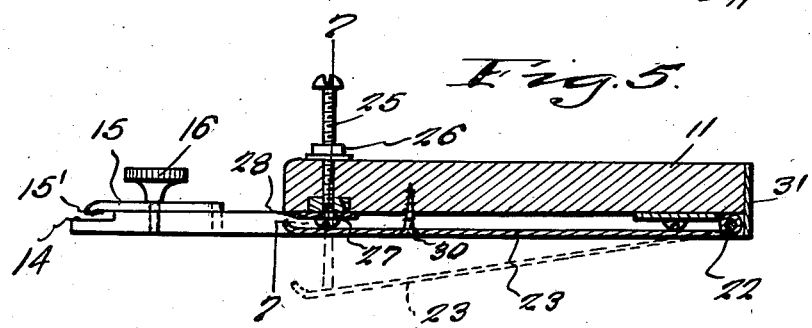
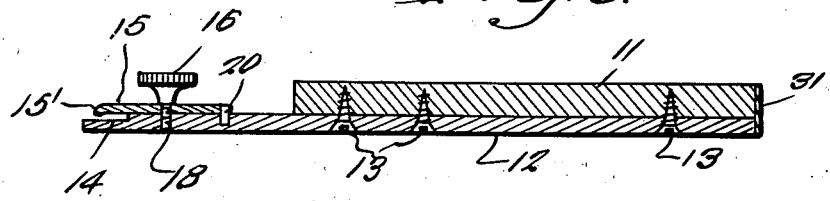
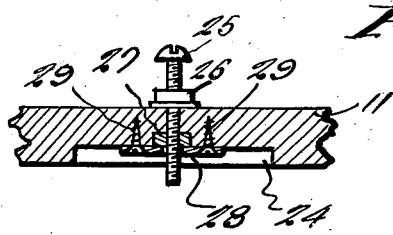
Inventor
Gregory Makaroff
By Clarence A. O'Brien
                              Attorney

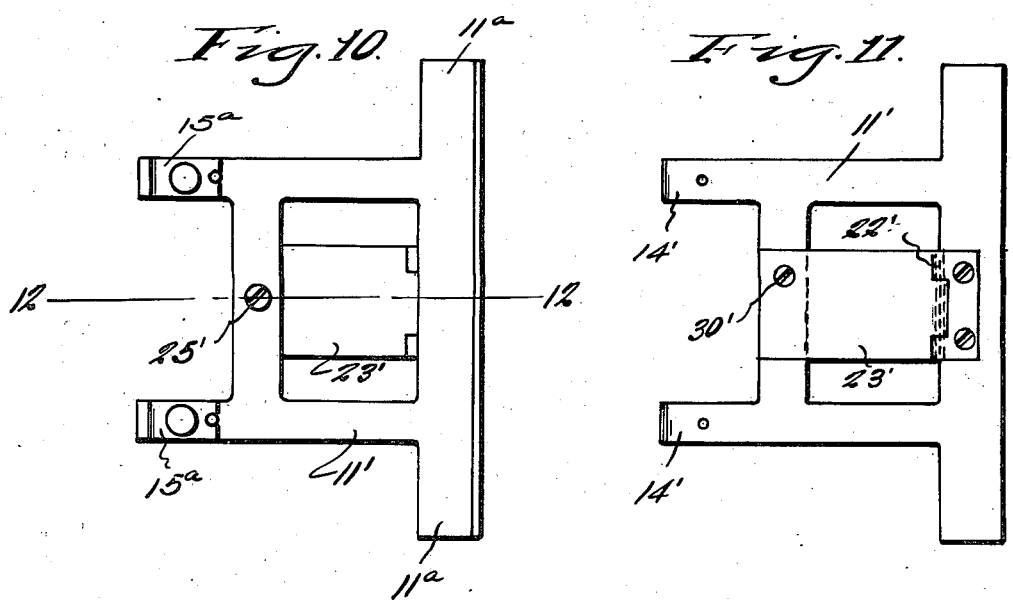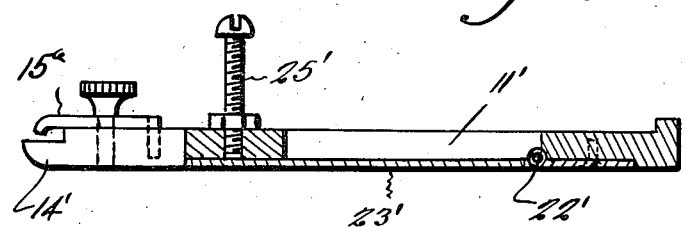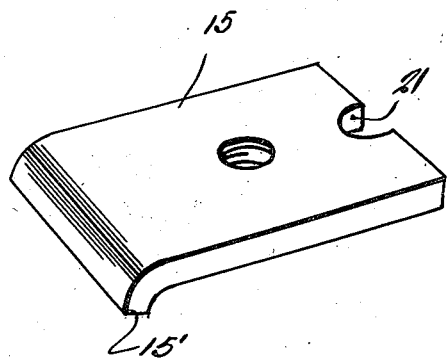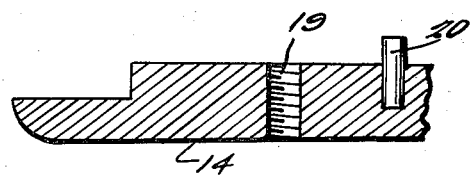

Patented Sept. 1, 1936

2,052,837

UNITED STATES PATENT OFFICE 2,052,837

GRINDING DEVICE

Gregory Makaroff, Lanesboro, Mass.

Application August 16, 1934, Serial No. 740,189

2 Claims. (Cl. 51—218)

This invention relates to devices for grinding tools, and more particularly for grinding blades of various types.

The invention comprehends the use of a conventional power driven saw organization wherein a grinding disk is substituted for the saw; and also the provision of improved blade holding or clamping means whereby the angularity of the blade may be adjusted at will to insure proper contact of the beveled edge of the blade with the periphery of the grinding disk in a manner to afford an almost perfect sharpening of the blade.

The invention, together with its objects and advantages, will be best understood from the following description taken in connection with the accompanying drawings wherein:

Figure 3 is a top plan view of one form of blade clamping and holding device.

Figure 4 is a bottom plan view thereof.

Figure 1:
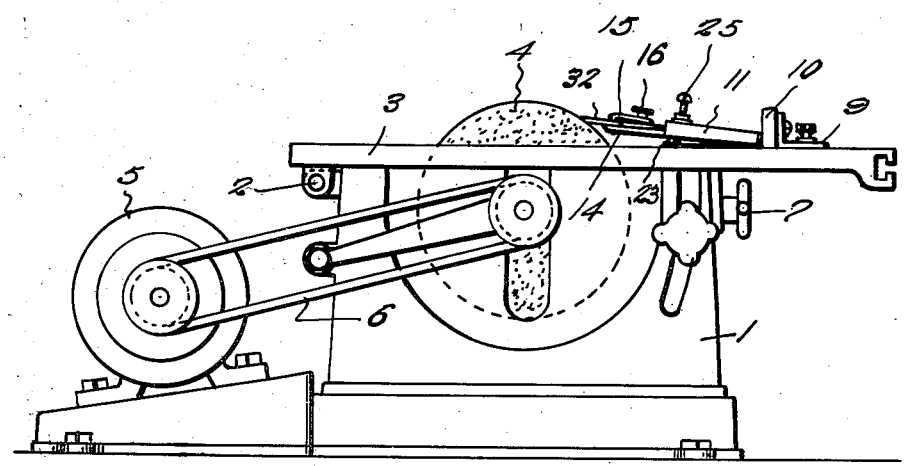
Figure 1 is a side elevational view illustrating the application of the invention.

Figures 5 and 6 are detail views taken substantially on the lines 5—5 and 6—6 respectively of Figure 3.

Figure 7 is a detail view taken substantially on the line 7—7 of Figure 5.

Figure 8 is a perspective view of a jaw member.

Figure 9 is a sectional view through the jaw member.

Figure 10 is a top plan view of a second form of blade clamp and holder.

Figure 11 is a bottom plan view thereof.

Figure 12 is a detail sectional view taken substantially on the line 12—12 of Figure 10.

Referring to the drawings by reference numerals, it will be seen that a conventional power driven saw assembly is utilized the same in the present instance consisting of a suitable support 1 to which is pivoted in the usual manner as at 2 the work table 3 that is slotted in the usual manner to receive the saw. However, in the present instance, the saw is removed and a grinding disk 4 is substituted therefor and operates through the slot in the table 3 as clearly shown in Figures 1 and 2. The shaft on which the grinding disk 4, in the present instance, is supported is driven from a suitable electric motor 5 through the medium of belt and pulley means 6 and in the usual manner. The usual means 7 is provided for securing the work table 3 at the desired angular adjustment relative to the horizontal.

The top of the table 3 is provided with the usual guide grooves 8 in a selected one of which work the usual guide square 9, with which all power driven saws are equipped. To the flange of the head of the square 9 is secured by suitable fastening means the usual work engaging bar 10.

My improved blade holder and clamp comprises generally a body member provided with spaced clamps for engagement with the blade to be sharpened for holding the blade in contact with the periphery of the grinding disk 4 and the body is equipped with suitable means hereinafter more fully referred to whereby the body of the device may be supported at the desired angle relative to the top 3 to insure the desired contact of the beveled edge of the blade being sharpened with the periphery of the grinding disk 4.

In the form shown in Figures 3 to 7 inclusive, the body of the blade clamp and holder consists of a rectangular block of wood or other suitable material and indicated by the reference numeral 11. A pair of strips 12 of metal or other suitable material has the major portions thereof fitting in grooves provided therefor in the underface of the body 11 and extending transversely of the body. The strips 12 are secured to the body through the medium of any number of suitable fastening devices such as screws 13. At their forward or free ends the strips 12 are rabbeted to form jaws 14.

Cooperating with the jaws 14 are removable jaws 15 which consist of rectangular pieces of wood or the like having a down-turned end 15' overlying the jaws 14 and cooperable therewith for clamping a portion of the blade to be sharpened therebetween. In the present instance, I have shown the jaws 15 removably secured to the strips 12 through the medium of finger screws 16 that thread into suitably alined openings 18 and 19 respectively provided in the strips 12 and jaws 15. To prevent the jaws 15 from rotating relative to the jaws 14 strips 12 on their upper sides are provided with pins 20 that are engaged by notches 21 provided in the rear end edges of the jaws 15.

In the end face thereof the body 11 between the strips 12 is formed with a transverse groove or pocket in which is hinged as at one end, and as at 22 an adjustment plate 23 that normally fits within the pocket, the latter being indicated by the reference numeral 24.

An adjustment screw 25 extends through the body 11 adjacent the forward end of the pocket 24 and is provided with a threaded collar 26 that rests on the top face of the body 11, the screw 25 threading through a nut 27 seated in a recess provided in the underside of the body 11, which nut is retained within its recess through the medium of a plate 28 secured in position through the medium of screws 29. Obviously, by threading the screw 25 downwardly into engagement with the plate 23 the latter will be forced to swing, for example, to the dotted line position shown in Figure 5 for varying the angular position of the body 11 when it is desired to adjust the angular position of the blade during the sharpening thereof without disturbing the set position of the table 3. In this connection, it will be thought apparent that if desired the angular relation of the blade in the holder in obtaining the proper contact of the beveled edge of the blade with the grinding disk 4 may be effected by varying the angle of the table or bench top 3. It will be apparent that either by the adjustment of the screw 25 or the adjustment of the table 3 the adjustment of the blade may be effected, very minute adjustments being effected through the medium of the screw 25.

When it is not intended to use the screw 25 and plate 23 for attaining this adjustment the plate 23 may be secured within the pocket 24 against casual displacement through the medium of a suitable screw 30.

The body 11 at the edge thereof opposite to the jaws 14 and 15 is provided with a metallic reinforcing plate 31.

Figure 2:
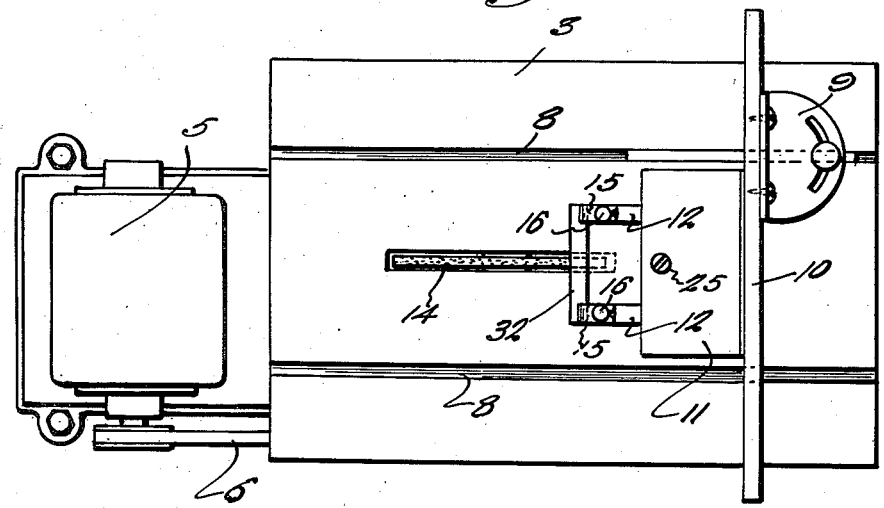
Figure 2 is a top plan view thereof.

In using the device, it will be apparent that the blade 32 to be sharpened has the end portions thereof clamped between the jaws 14 and 15. The square or miter gauge 9 is set at the desired position when the reinforced edge 31 of the body 11 is then placed against the member 10 as shown in Figures 1 and 2 with the beveled edge of the blade 32 in contact with the periphery of the disk 4. As the driven disk 4 revolves, the body 11 with the associated parts may be moved back and forth transversely across the table 3 with the edge of the blade 32 at all times in contact with the periphery of the grinding disk 4 to insure a smooth even edge for the blade.

For the holder just described there may be substituted a holder and clamp of the type shown in Figures 10 to 12 inclusive. In this form the holder consists of comparatively few parts and will be more light in weight than the holder herein first described. The second form of holder comprises a body 11' laterally extended at its rear end as at 11a and at said end being adapted to have the edge thereof engaged with the fence or guide bar 10 in the same manner as the edge 31 of the first type of clamp engages said fence or guide member. Also, at the edge thereof opposite to the first named edge, the portions of the body 11' are extended to provide fixed jaws 14' similar to the fixed jaws 14 hereinbefore described, and with which are cooperable removable jaws 15a that are identical with the first mentioned jaws 15. As shown, and as will be understood, the jaws 14' are provided with pins corresponding to the pins 20 and the jaws 15a at their rear edges are provided with notches corresponding with the aforementioned notches 21 to engage the pins 20.

The body 11' in the underside thereof is also suitably recessed to accommodate the adjustment plate 23' which is hinged to the body 11' as at 22'. An adjustment screw 25' is threadedly engaged with the forward portion of the body 11' in a manner to engage the plate 23' for varying the angular relative position of the body 11' and the plate 23' in obtaining the desired contact of the blade with the grinding disk. The plate 23', when not to be used, will be also held in fixed position through the medium of a suitable screw 30'.

This second form of blade holder and clamp is used in substantially identically the same manner as the first form of blade holder and clamp is used and as hereinbefore clearly described relative to the first form of blade holder and clamp.

What is claimed is:

1. A blade holder of the character described comprising a substantially flat body, strips secured to one side of the body and extending transversely thereof, said strips being provided at one end with jaws projecting beyond an edge of the body, removable jaws cooperable with the first named jaws, means for preventing rotation of said removable jaw, and means for securing the removable jaws to the strips in operative positions relative to the first named jaws.

2. A blade holder of the character described comprising a substantially flat body, strips secured to one side of the body and extending transversely thereof, said strips being provided at one end with jaws projecting beyond an edge of the body, removable jaws cooperable with the first named jaws, and means for securing the removable jaws to the strips in operative positions relative to the first named jaws, said removable jaw being provided with a slot therein, a pin on the first named jaw receivable in said slot, said body in said one side thereof and between the strips being provided with a recess, an adjustment plate normally arranged in the recess and hinged to the body, and an adjustment screw threaded to the body to engage the adjustment plate.

GREGORY MAKAROFF.